United States Patent
Bhatia et al.

(10) Patent No.: US 8,068,821 B2
(45) Date of Patent: *Nov. 29, 2011

(54) METHOD AND APPARATUS FOR PROVIDING CONTENT TO USERS USING UNICAST AND BROADCAST WIRELESS NETWORKS

(75) Inventors: Randeep S. Bhatia, Somerset, NJ (US); Girija J. Narlikar, Basking Ridge, NJ (US); Sampath Rangarajan, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 552 days.

This patent is subject to a terminal disclaimer.

(21) Appl. No.: 11/693,262

(22) Filed: Mar. 29, 2007

(65) Prior Publication Data

US 2008/0242290 A1    Oct. 2, 2008

(51) Int. Cl.
    *H04M 3/42*    (2006.01)
(52) U.S. Cl. .......... 455/414.1; 455/452.2; 370/329; 709/203
(58) Field of Classification Search .......... 455/574, 455/414.1; 370/329, 328, 395.4; 709/203, 709/247
See application file for complete search history.

(56) References Cited

U.S. PATENT DOCUMENTS

| | | | |
|---|---|---|---|
| 7,171,473 B1 | 1/2007 | Eftis et al. | |
| 2002/1099209 | 12/2002 | Shiga | |
| 2003/0012180 A1 | 1/2003 | Donahue et al. | |
| 2003/0093476 A1 | 5/2003 | Syed | |
| 2003/0095540 A1 | 5/2003 | Mulligan et al. | |
| 2003/0169704 A1 | 9/2003 | Okanoue | |
| 2004/0031058 A1 | 2/2004 | Reisman | |
| 2004/0253996 A1* | 12/2004 | Chen et al. | 455/574 |
| 2004/0260839 A1* | 12/2004 | Onoda et al. | 709/247 |
| 2005/0009547 A1 | 1/2005 | Harris et al. | |
| 2005/0027742 A1 | 2/2005 | Eichstaedt et al. | |
| 2005/0198354 A1 | 9/2005 | Holloway | |
| 2006/0019679 A1 | 1/2006 | Rappaport et al. | |
| 2006/0046699 A1 | 3/2006 | Guyot et al. | |
| 2006/0126556 A1 | 6/2006 | Jiang et al. | |
| 2006/0135143 A1 | 6/2006 | Suematsu | |
| 2006/0171523 A1 | 8/2006 | Greenwell | |
| 2006/0229065 A1 | 10/2006 | Lazaridis et al. | |
| 2007/0032225 A1 | 2/2007 | Konicek et al. | |

(Continued)

FOREIGN PATENT DOCUMENTS

| | | |
|---|---|---|
| EP | 1 853 045 A | 11/2007 |
| FR | 2 884 379 A | 10/2006 |
| WO | WO 02/054174 A | 7/2002 |
| WO | WO 2004/008789 | 1/2004 |

OTHER PUBLICATIONS

International Search Report and Written Opinion in PCT/US2008/003271, dated Aug. 14, 2008, 18 pages.

(Continued)

*Primary Examiner* — Kamran Afshar
*Assistant Examiner* — Shahriar Behnamian
(74) *Attorney, Agent, or Firm* — Wall & Tong, LLP

(57) ABSTRACT

The invention includes a method and apparatus for providing content to user terminals. A method includes identifying a request for content from a user terminal, obtaining a network selection parameter for the content request, selecting, using the network selection parameter, a wireless network over which to propagate the requested content, and propagating the requested content toward the user terminal using the selected wireless network. The selected wireless network may be a unicast wireless network or a broadcast wireless network.

24 Claims, 4 Drawing Sheets

U.S. PATENT DOCUMENTS

| | | |
|---|---|---|
| 2007/0153820 A1 | 7/2007 | Gould |
| 2007/0168523 A1* | 7/2007 | Jiang et al. .................. 709/228 |
| 2007/0239884 A1 | 10/2007 | Karmakar et al. |
| 2007/0260744 A1 | 11/2007 | Shenfeld |
| 2007/0286121 A1* | 12/2007 | Kolakowski et al. ......... 370/329 |
| 2007/0287475 A1 | 12/2007 | Jeong et al. |
| 2008/0025307 A1 | 1/2008 | Preiss et al. |
| 2008/0101317 A1 | 5/2008 | Bouazizi |
| 2009/0298496 A1 | 12/2009 | Pettersson et al. |

OTHER PUBLICATIONS

Huang, Y-W et al.: "A bandwidth-sensitive update scheduling method for Internet push" 19980526; 19980526-19980529, May 26, 1998, pp. 303-310, XP010284011, p. 303, paragraph 1 Introduction—p. 304, paragraph 1, Introduction.

PCT Search Report and Written Opinion corresponding PCT/US2008/003272, dated Mar. 13, 2008, Lucent Technologies Inc., Applicant.

* cited by examiner

METHOD AND APPARATUS FOR PROVIDING CONTENT TO USERS USING UNICAST AND BROADCAST WIRELESS NETWORKS

FIELD OF THE INVENTION

The invention relates to the field of communication networks and, more specifically, to providing content over wireless networks.

BACKGROUND OF THE INVENTION

Existing cellular networks support bidirectional unicast capabilities, while emerging cellular networks (e.g., Third Generation (3G) cellular networks), support coexistence of bidirectional unicast capabilities and broadcast capabilities. Disadvantageously, however, broadcast capabilities of such emerging networks are limited to non-personalized content and, further, the non-personalized content must be delivered according to a fixed schedule.

SUMMARY OF THE INVENTION

Various deficiencies in the prior art are addressed through the invention of a method and apparatus for providing content to user terminals. A method includes identifying a request for content from a user terminal, obtaining a network selection parameter for the content request, selecting, using the network selection parameter, a wireless network over which to propagate the requested content, and propagating the requested content toward the user terminal using the selected wireless network. The selected wireless network may be a unicast wireless network or a broadcast wireless network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides dynamic delivery of content using a hybrid wireless network including a unicast wireless network and a broadcast wireless network. The present invention dynamically serves content requests either individually using a unicast network or as a group using a broadcast wireless network, thereby improving network utilization and end user experience. The present invention identifies content requests and selects the wireless network used to serve the content requests (either a unicast wireless network or a broadcast wireless network) based network selection information. Thus, the present invention is able to utilize advantageous features of unicast wireless networks and broadcast wireless networks in order to optimize delivery of content to wireless users.

Figure 1:
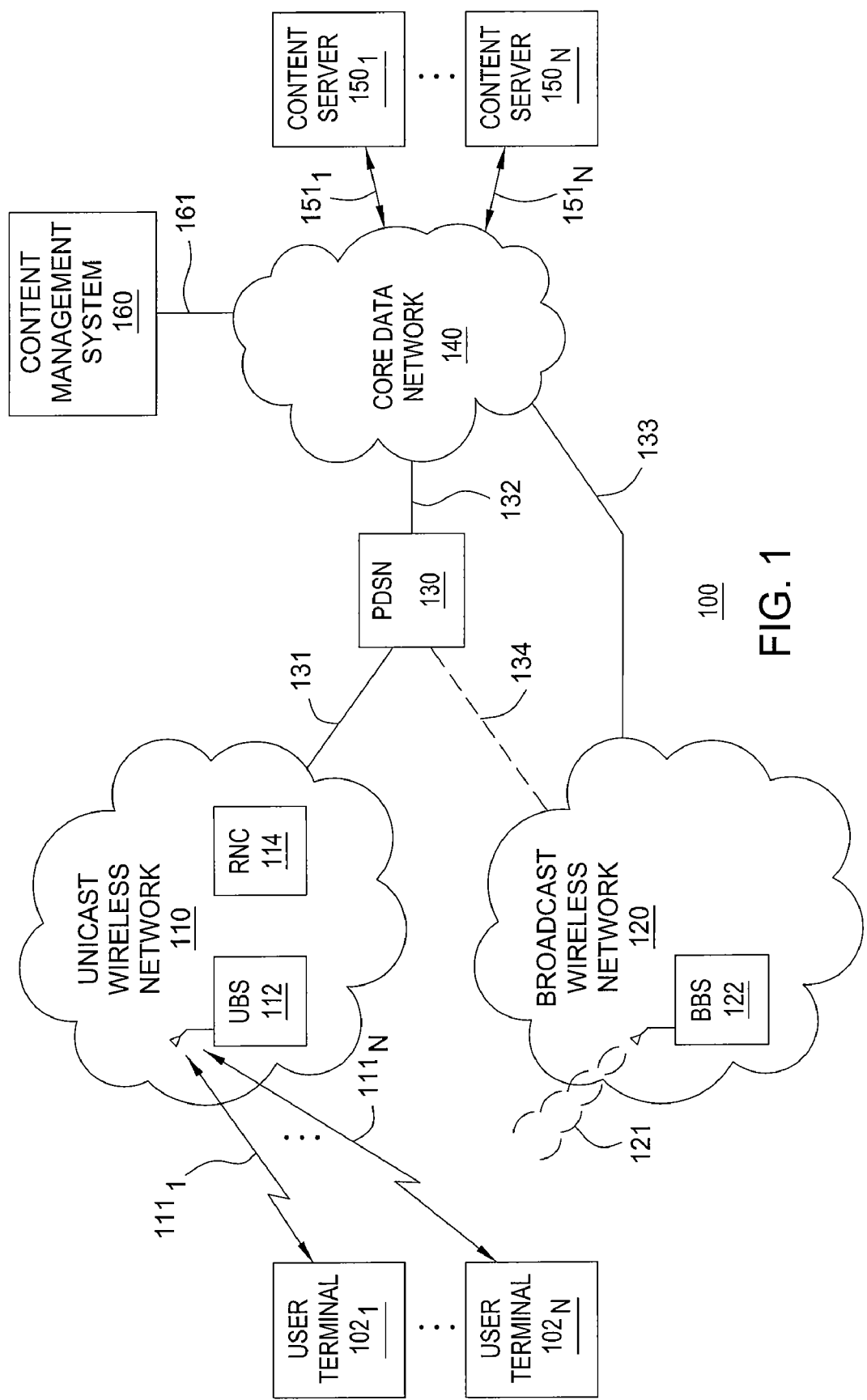
FIG. 1 depicts a high-level block diagram of a communication network.

FIG. 1 depicts a high-level block diagram of a communication network. Specifically, communication network 100 includes a plurality of user terminals (UTs) $102_1$-$102_N$ (collectively, UTs 102), a unicast wireless network (UWN) 110, a broadcast wireless network (BWN) 120, a packet data serving node (PDSN) 130, a core data network (CDN) 140, a plurality of content servers (CSs) $150_1$-$150_N$ (collectively, CPSs 150), and a content management system (CMS) 160. As described herein, communication network 100 supports propagation of content from CSs 150 to UTs 102. The CMS 160 manages propagation of content from CSs 150 to UTs 102, as further described herein with respect to FIG. 1 and further depicted and described herein with respect to FIG. 2.

As depicted in FIG. 1, UTs 102 communicate with UWN 110 and BWN 120. The UTs $102_1$-$102_N$ receive communications from UWN 110 and transmit communications to UWN 110 using a respective plurality of bidirectional wireless links (BWLS) $111_1$-$111_N$ (collectively, BWLs 111). The UTs $102_1$-$102_N$ receive broadcast communications from BWN 120 using a unidirectional wireless link (UWL) 121. The UWL 121 is a broadcast link that may be shared by UTs 102. The UTs 102 may tune to UWL 121 to receive content being broadcast. The UWL 121 may support multiple channels of broadcast content such that UTs 102 may tune to a channel on which desired content is being transmitted.

The UWN 110 communicates with PDSN 130 using a communication path (CP) 131. The PDSN 130 communicates with CDN 140 using a communication path (CP) 132. The BWN 120 communicates with CDN 140 using a communication path (CP) 133. In one embodiment, BWN 120 may communicate with PDSN 130 using a communication path (CP) 132. The CSs $150_1$-$150_N$ communicate with CDN 140 using a respective plurality of communication paths (CPs) $151_1$-$151_N$ (collectively, CPs 151). The CMS 160 communicates with CDN 140 using a communication path (CP) 161. In one embodiment, CMS 160 optionally communicates directly with UWN 110 and/or BWN 120.

The CSs 150 provide content to UTs 102. In one embodiment, CSs 150 provide locally-stored content to UTs 102. In one embodiment, CSs 150 may provide remotely-available content (e.g., received from other content sources) to UTs 102. The content may include various types of content, such as text content, audio content, image content, video content, multimedia content, and the like, as well as various combinations thereof. For example, content stored by CPSs 140 may include text-based information (e.g., news headlines, weather updates, stock quotes, and the like), audio clips, still images, animated images, video clips, multimedia clips, software updates, and the like, as well as various combinations thereof. The CSs 150 may be maintained by content providers, network providers, and the like, as well as various combinations thereof.

In one embodiment, CSs 150 may provide content to UTs 102 directly using CDN 140 and BWN 120. In one embodiment, CSs 150 may provide content to UTs 102 indirectly by providing content to CMS 160 (which provides the content to UTs 102 using BWN 120 and, optionally, CDN 140, depending on the implementation). The CSs 150 may provide content to UTs 102 using various different content formats depending on factors such as the type of content being provided, the quality of content being provided, the quality-of-service with which the content is provided, the network implementation in which the content is provided (i.e., whether or not CMS 160 operates as a proxy/cache for CSs 150), and like factors, as well as various combinations thereof.

The CDN 140 facilitates communications in support of the present invention (e.g., communication of content requests from UTs 102 to CMS 160, communication of state information from components of UWN 110 to CMS 160, communication of content from CSs 150 to UTs 102, and the like, as well as various combinations thereof). For example, CDN 140 may be any packet-based network, e.g., a public data network (e.g., the Internet), a private data network, and the like, as well as various combinations thereof. The PDSN 130 facilitates communications between wireless access networks and core data networks (illustratively, between UWN 110 and CDN 150 and between BWN 120 and CDN 150), operating as an access point between wireless access networks UWN 110 and BWN 120 and CDN 150).

The UWN 110 supports bidirectional unicast communications for UTs 102. The UWN 110 includes a unicast base station (UBS) 112 and a radio network controller (RNC) 114, among other components omitted for purposes of clarity. The UNW 110 supports upstream communication of control information from UTs 102 using BWLs 111 (as reverse wireless links), respectively. The control information may include requests for content from respective ones of UTs 102, acknowledgement messages from respective ones of UTs 102, and the like, as well as various combinations thereof. The UWN 110 may support downstream communication of content to UTs 102 using BWLs 111 (as forward wireless links), respectively. For example, UWN 110 may be a CDMA2000-based EVDO wireless network.

The BWN 120 supports unidirectional broadcast communications for UTs 102. The BWN 120 includes a broadcast base station (BBS) 122, among other components omitted for purposes of clarity (e.g., controllers, servers, or like components which may control broadcasting of content from BWN 120). The BWN 120 supports broadcasting of content to UTs 102 using UWL 121, which may support one or more broadcast channels such that UTs 102 may tune to different broadcast channels to receive different content. As described herein, the content may include general content, personalized content, and the like, as well as various combinations thereof. For example, BWN 110 may be a MediaFLO broadcast wireless network.

The UTs 102 include terminals adapted for wireless communications. The UTs 102 support unicast communications via UWN 110. The unicast wireless communications include transmitting information to UWN 110 and receiving information from UWN 110 using BWLs 111. The UTs 102 may transmit content requests, state information, content acknowledgments, and the like, using UWN 110. The UTs 102 may receive scheduling information, state information requests, and the like, using UWN 110. The UTs 102 support broadcast wireless communications from BWN 120. The broadcast wireless communications include receiving information from BWN 120 using UWL 121. The UTs 102 may receive content from BWN 120.

The UTs 102 provide means by which respective users may request content. For example, each of the UTs 102 includes one or more user interfaces (e.g., buttons, keypads, and the like) enabling associated users to subscribe to content services, request content, interact with content (e.g., play the content, pause the content, and the like), and the like, as well as various combinations thereof. The UTs 102 provide means by which respective users may review received content. For example, each of the UTs 102 includes one or more user interfaces (e.g., screens, speakers, and the like) enabling associated users to review content. For example, UTs 102 may include wireless user terminals such as mobile phones, personal digital assistants, and the like.

The CMS 160 manages delivery of content from CSs 150 to UTs 102. The CMS 160 identifies requests for content from UTs 102. The CMS 160 identifies the content requested in the content requests. The CMS 160 selects a wireless network over which requested content is provided in response to a content request (selecting either to serve the content request individually using a unicast wireless network or to serve the content request collectively with other content requests using a broadcast wireless network). The CMS 160 selects whether a content request is served using a unicast wireless network or a broadcast wireless network using network selection parameters. The CMS 160 provides requested content to the associated user terminal(s) using the network(s) selected to provide that content. The operation of CMS 160 in managing content delivery may be better understood with respect to FIG. 2.

The CMS 160 identifies requests for content associated with UTs 102. The requests for content may include requests for content received from UTs 102 (requests received over UWN 110), requests for content identified from user content subscription information associated with users of UTs 102, and the like, as well as various combinations thereof. In other words, for content requests identified from user content subscription information, as content to which a user subscribes becomes available, since that content must be delivered to the user according to the content subscription, the subscription by the user to receive that content may be considered a content request. In one such embodiment, in response to a determination that the content subscribed to by a user has become available, CMS 160 may trigger an internal content request for the associated UT 102.

The CMS 160 may store user content subscription information, which may include any information associated with content service(s) subscribed to by the user. The user content subscription information may identify content subscribed to by the user, the level of service with which content subscribed to by the user is to be provided to the user, the quality-of-service with which content subscribed to by the user is to be provided to the user, the time(s) at which the user plans to (or is expected to) received and/or review the content subscribed to by the user, and the like, as well as various combinations thereof. Although described as being stored in CMS 160, user content subscription information may be stored in other network components (e.g., CSs 150, user profile databases, user subscription databases, and the like, as well as various combinations thereof).

The CMS 160 obtains network selection parameters, which include any information useful in determining whether requested content should be provided to the associated UT(s) 102 over UWN 110 or BWN 120. For example, network selection parameters may include a content delivery time for the content (i.e., a requested time by which the requested content should be, or deadline time by which the requested content must be, provided to UTs 102, which may be based on information associated with the user(s) requesting the content, information associated with the content, information associated with the intended application of the content, and the like), a number of other requests for that content associated with other UTs 102, an available bandwidth of UWN 110, an available bandwidth of BWN 120, user subscription information, content request history information, and the like, as well as various combinations thereof. The CMS 160 may obtain network selection parameters from various sources.

In one embodiment, CMS 160 may obtain at least a portion of the network selection parameters locally (i.e., information stored within CMS 160). For example, CMS 160 may locally obtain a content delivery time for requested content (or determine the content delivery time, e.g., based on information about the user requesting the content, based on information about the content, based on information about application of the content, and the like, as well as various combinations thereof). For example, CMS 160 may locally obtain a number of other requests for that content (i.e., requests for that content that are associated with other UTs 102. For example, CMS 160 may locally obtain user subscription information. For example, CMS 160 may locally obtain content request history information. The CMS 160 may obtain more or less information locally.

In such embodiments, in which CMS 160 obtains network selection parameters locally, the network selection parameters may be stored on CMS 160 directly (e.g., information maintained on CMS 160) and/or indirectly (e.g., network selection parameters stored on other components in the network that are transferred to CMS 160, e.g., periodically, aperiodically in response to requests from CMS 160, and the like). In one embodiment, in which CMS 160 is implemented on one or more existing network components (e.g., on one or more of PDSN 130, RNC 114, BTSs 112, and the like; rather than being implemented as a standalone system), CMS 160 may obtain various other network selection parameters locally, depending on the network component(s) on which CMS 160 is implemented. The implementation of CMS 160 on existing network components is depicted and described herein with respect to FIG. 3.

In one embodiment, CMS 160 may obtain at least a portion of the network selection parameters remotely, i.e., from one or more network components, such as PDSN 130, RNC 114, UBS 112, BBS 122, and the like, as well as various combinations thereof). For example, CMS 160 may obtain the available bandwidth of UWN 110 from one or both of RNC 114 and UBS 112 and, similarly, may obtain the available bandwidth of BWN 120 from BBS 122 or other components of BWN 120. For example, CMS 160 may obtain some of the information from CSs 150, such as a content delivery time by which the requested content must be provided to UT(s) 102, a number of other requests for specific content, content request history information, user subscription information, and the like, as well as various combinations thereof. The CMS 160 may obtain more or less information remotely.

The CMS 160 selects a wireless network over which requested content is provided in response to a content request (selecting either to serve the content request individually using UWN 110 or to batch the content requests with other requests for that specific content and serve the batched content request collectively using BWN 120). The CMS 160 selects whether a content request is served using UWN 110 or BWN 120 using network selection parameters. In other words, CMS 160 dynamically manages propagating of content from CSs 150 to UTs 102 according to various factors and conditions specified by the network selection parameters.

The CMS 160 controls transmission of content to UTs 102. The CMS 160 selects the wireless network over which requested content is transmitted (e.g., over UWN 110 and/or BWN 120, depending on the network selection parameters). The content transmitted over UWN 110 is transmitted to UTs 102 using respective BWLs 111. The content transmitted over BWN 120 is transmitted to UTs 102 using respective UWL 121 (i.e., by broadcasting the content such that UTs 102 may tune to a channel to receive the content). In one embodiment, CMS 160 provides content to UTs 102. In one such embodiment, CMS 160 downloads and stores content from one or more of the CSs 150 and propagates the stored content to UTs 102 using the selected wireless network(s) (i.e., CMS 160 functions as a proxy/cache for CSs 150). In one embodiment, CMS 160 directs one or more of the CSs 150 to transmit the content to UTs 102 (e.g., using request messages, trigger signals, or any other means of directing CSs 150 to begin transmitting the requested content to UTs 102 using the selected wireless network(s)).

In one embodiment, in which CMS 160 operates as a proxy for CSs 150, CMS 160 propagates the content to UTs 102. In this embodiment, CSs 150 provide content to CMS 160 (which transmits the content to UTs 102 using UWN 110 and/or BWN 120). The CSs 150 may provide content to CMS 160 as the content becomes available, in response to requests for content received from CMS 160, and the like, as well as various combinations thereof. The CMS 160 may request content from CSs 150 upon receiving content requests from UTs 102, at any other time prior to the scheduled transmission time, at the scheduled transmission time, and the like. The CSs 150 may provide content to CMS 160 in response to other requests, triggers, notifications, and the like, as well as various combinations thereof. The CSs 150 may provide content to CMS 160 using CDN 140 (and, depending on the implementation of CMS 160, using a portion of BWN 120).

In one embodiment, in which CMS 160 does not operate as a proxy for CSs 150, CSs 150 transmit content to UTs 102. The content is transmitted to UTs 102 using UWN 110 and/or BWN 120 (as well as using CDN 140 and PDSN 130). In one embodiment, CSs 150 may transmit content to UTs 102 in response to requests/triggers received from CMS 160. The CMS 160 may provide such requests/triggers to CSs 150 at any time (e.g., upon selection of the wireless network over which content should be transmitted, at the content delivery time for that content, and the like, as well as various combinations thereof). The CMS 160 communicates the wireless network selected for specific content requests to CSs 150, thereby enabling CSs 150 to direct content to the correct wireless networks. The CSs 150 may transmit content to UTs 102 in response to other requests, triggers, notifications, signals, and the like, as well as various combinations thereof.

Although primarily depicted and described herein as using a specific type of unicast wireless network (illustratively, an EVDO unicast wireless network) and a specific type of broadcast wireless network (illustratively, a MediaFLO broadcast wireless network), the content delivery functions of the present invention may be implemented using various other types of unicast wireless networks and broadcast wireless networks. For example, content delivery functions of the present invention may be implemented using other unicast wireless networks and/or other broadcast wireless networks, as well as various combinations thereof.

In one embodiment, for example, the unicast wireless network may be a Universal Mobile Telecommunications System (UMTS) wireless network, a General Packet Radio Service (GPRS) wireless network, and the like. In one embodiment, for example, the broadcast wireless network may be a Multimedia Broadcast Multicast Service (MBMS) network, a Digital Multimedia Broadcasting (DMB) network, and the like. Although primarily depicted and described herein as separate networks, in one embodiment the unicast and broadcast wireless networks may be integrated, such as in a Broadcast and Multicast Service (BCMCS) wireless network and like networks. In one such embodiment, for example, UBS 112 and BBS 122 may be co-located.

Since, as described herein, the present invention is not limited to implementation using CDMA2000-based EVDO unicast wireless networks, although primarily depicted and descried herein within the context of a CDMA2000-based EVDO unicast wireless network in which at least a portion of the network selection information is available from BSs, RNCs, and PDSNs, network selection information may be obtained from any network components from which such information is available. For example, in UMTS and GPRS wireless networks, network selection information may be obtained from Serving GPRS Support Node (SGSN) and/or Gateway GPRS Support Node (GGSN) components, although information available from such components may vary depending on wireless network type since such components often perform different functions in different wireless networks. Thus, network selection information may be obtained from any source of such network selection information.

Figure 2:
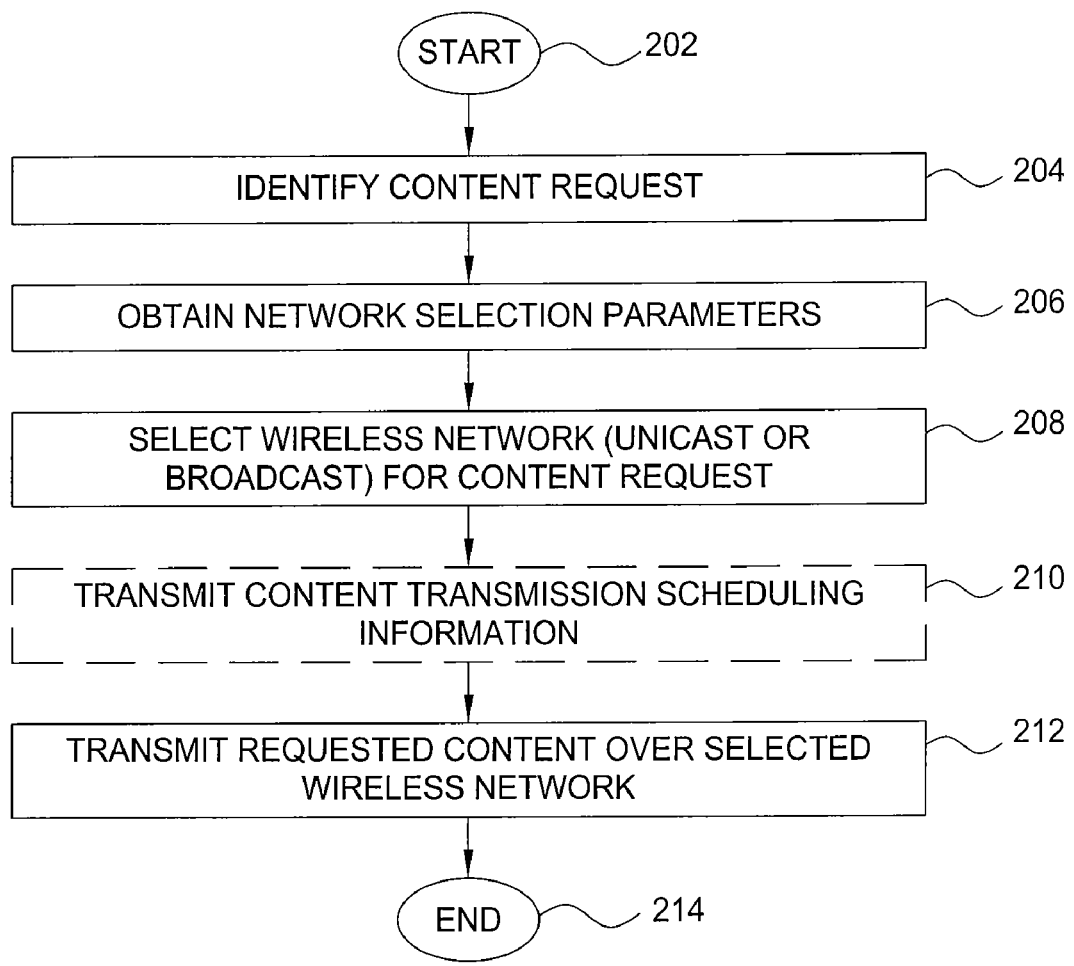
FIG. 2 depicts a method according to one embodiment of the present invention.

FIG. 2 depicts a method according to one embodiment of the present invention. Specifically, method 200 of FIG. 2 includes a method for providing content to user terminals by dynamically selecting between a unicast wireless network and a broadcast wireless network to provide the requested content to the user terminals. Although primarily depicted and described with respect to user terminals within one cellular region, method 200 may be adapted for use in wireless networks including multiple cellular regions. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, a content request is identified. The content request identifies content requested by a user of a user terminal, such as text information, audio clips, video clips, multimedia clips, and the like, as well as various combinations thereof. The content request may be identified as a content request that received from the user terminal over a unicast wireless network. The content request may be identified from user service subscription information associated with the user of the user terminal. For example, when users subscribe to content services (i.e., users request to receive certain content), when that content becomes available the available content must be provided to each of the users and, thus, subscription by those users to the content service effectively operate as content requests.

At step 206, network selection parameters are obtained for use in selecting a wireless network over which to provide the requested content. The network selection parameters include any information adapted for use in determining whether to transmit the requested content over a unicast wireless network or a broadcast wireless network. The network selection parameters may be obtained from one or more network components. The network selection parameters, as well as various sources of the network selection parameters and manner in which network selection parameters may be obtained, is described herein within the context of the communication network (i.e., with respect to FIG. 1).

As described herein, the network selection parameters may include information associated with the content, information associated with the user requesting the content, information associated with available wireless networks over which the requested content may be transmitted, and the like, as well as various combinations thereof. For example, the network selection parameters may include information such as information identifying the requested content, a content delivery time for the requested content (which may include requested and/or deadline delivery times, a number of other requests for that content identified from other users, an available bandwidth of the unicast wireless network (or load of the unicast wireless network), an available bandwidth of broadcast wireless network (or load of the broadcast wireless network), user subscription information, content request history information and the like, as well as various combinations thereof.

At step 208, a wireless network is selected. The selected network is the network over which the requested content (associated with the content request(s) for which the network selection is performed) will be transmitted (assuming that the selected network is not dynamically changed based on updated network selection parameters). The selected network may be a unicast wireless network or a broadcast wireless network. The wireless network is selected using the network selection parameters. The evaluation of network selection parameters for purposes of selecting a wireless network over which to provide requested content may be better understood with respect to the following examples.

In one embodiment, for example, when a content request is a request for content that has a delivery deadline in the near future (which may be a deadline based on the user as determined from user service subscription information, a deadline based on the content as determined from information about the content, and the like) the requested content may be provided to the user immediately using the unicast wireless network (rather than waiting for additional requests for that content in order to batch the requests for delivery over the broadcast wireless network). In a similar embodiment, when a content request is a request for content that does not have an associated delivery deadline, providing of the requested content to the user may be delayed until additional requests for that content are identified, at which time the requested content may be provided to the users using the broadcast wireless network.

In one embodiment, for example, when a content request is associated with a user that subscribes to a premium service level (as determined from service subscription information associated with the user), the requested content may be provided to the user immediately using the unicast wireless network (rather than waiting for additional requests for that content in order to batch the requests for delivery over the broadcast wireless network). In a similar embodiment, when a content request is associated with a user that subscribes to a lower service level, providing of the requested content to the user may be delayed until additional requests for that content are identified, at which time the requested content may be provided to the users using the broadcast wireless network.

In one embodiment, for example, when a large number of content requests for the same content are identified, the requested content may be provided to the users using the broadcast wireless network (rather than overloading the unicast wireless network in order to delivery content requested by a large number of user). In one embodiment, for example, when a small number of content requests for the same content are identified, the requested content may be provided to the users using the broadcast wireless network if the unicast wireless network has a large load (rather than overloading the unicast wireless network in order to deliver the content).

The determination as to whether the number of content requests for identical content is large or small (i.e., the evaluation of the number of content requests for identical or similar content) may depend on a number of different factors, such as the size of the wireless network (e.g., based on total network capacity for the unicast wireless network and/or broadcast wireless network), the actual, estimated, or predicted load of the wireless network (e.g., based on available bandwidth for the unicast wireless network and/or broadcast wireless network), and the like, as well as various combinations thereof.

In one embodiment, evaluation of the number of content requests for identical or similar content may be performed using one or more thresholds. For example, the threshold number of content requests may be set to five (e.g., based on one or more of the factors discussed above). In this example, five or less requests for identical content are designated to be served using a unicast wireless network while more than five requests for identical content are designated to be served using a broadcast wireless network. In such embodiments, selection of the unicast wireless network or broadcast wireless network to serve the requests may be subject to evaluation of one or more other network selection parameters.

In one embodiment, for example, when a content request is a request for content that is unlikely to be requested again in the near future (e.g., as determined from content request history information which may indicate a low request rate for this particular content), the requested content may be provided to the user immediately using the unicast wireless network (rather than waiting for additional requests for that content in order to batch the requests for delivery over the broadcast wireless network). In a similar embodiment, for example, when a content request is a request that is likely to be requested again in the near future, providing of the requested content to the user may be delayed until additional requests for that content are identified (since such requests are likely to be received), at which time the requested content may be provided to the users, as a group (i.e., batched), using the broadcast wireless network.

Although primarily described with respect to examples in which specific network selection parameters are evaluated in order to select the wireless network used to serve a content request (for purposes of illustrating how each of the network selection parameters may be used), selection of the wireless network used to serve a content request may be performed by evaluating various combinations of network selection parameters. In one embodiment, multiple, if not all, network selection parameters may be evaluated in order to select the wireless network used to provide content in response to content requests. In one further embodiment, in which multiple network selection parameters are evaluated, multiple network selection parameters may be prioritized such that certain network selection parameters are more important than other network selection parameters in selecting the wireless network over which requested content is transmitted to user terminals.

For example, where the threshold number of content requests is set to five (as described in the example above) for more than five requests for identical content, all but one of those content requests may designated to be served using a broadcast wireless network, while the remaining one of the content requests may be designated to be served by the unicast wireless network (e.g., if the associated user is subscribed to a premium service). In this example, both the number of requests for identical content and the user subscription information is evaluated for purposes of selecting the wireless network over which each of the content requests are served (which, in this example, results in selection of the broadcast wireless network for all but one of the requests for identical content).

As described herein, in one embodiment, in which multiple network selection parameters are evaluated for purposes of selecting the wireless network used to provide content in response to content requests, at least some of the network selection parameters may be prioritized with respect to each other, such that some of the network selection parameters are considered to be more important than others of the network selection for purposes of determining whether to serve a content request using a unicast wireless network or a broadcast wireless network. An example illustrating prioritization of network selection parameters follows.

In one such embodiment, for example, content delivery time may be given highest priority such that content is provided to users by the content delivery deadline (if there is one), user level of service may be given the next highest priority (e.g., only for users subscribed to premium service) such that users subscribed to premium service do not have to wait to receive requested content, content request history information may be given next highest priority such that content unlikely to be requested again soon (e.g., as determined from a content request rate) is not delayed in an attempt to batch a current request with future requests which may or may not be received, network bandwidth availability information may be given the next highest priority, and so on.

With respect to prioritization of network selection parameters, the previous example is merely one example illustrating prioritization of network selection parameters. The network selection parameters may be prioritized in various other ways. Furthermore, prioritization of the network selection parameters may be dynamic, such that the prioritization of the network selection parameters changes according to one or more factors. For example, prioritization of network selection parameters may be dynamically modified according to the type of content requested, the amount of time between the time at which evaluation of the network selection parameters is performed and the time by which the requested content should be or must be delivered, and the like, as well as various combinations thereof.

Although primarily depicted and described with respect to one content request, since evaluation of the content request may be performed with respect to evaluation of other content requests for purposes of determining whether to serve the content requests individually using a unicast wireless network or as a group using a broadcast wireless network, method 200 may be performed for each of the identified content requests, either individually or as a group, for purposes of determining whether the content requests are served using the unicast wireless network or the broadcast wireless network. Similarly, some portions of method 200 may be performed for each individual content request while other portions of method 200 may be performed for groups of content requests (e.g., all content requests regardless of content requested, subgroups of content requests requesting similar content, and the like, as well as various combinations thereof).

Although primarily depicted and described with respect to network selection parameters, other information may be used in order to select the wireless network over which requested content is transmitted to user terminals. In one embodiment, state information, such as network-level state information and user-level state information may be evaluated in order to select the wireless network over which requested content is transmitted to user terminals. In one such embodiment, state information may include one or more of user channel quality information, user terminal power state information, user terminal battery power and/or memory status information, and the like, as well as various combinations thereof. Furthermore, various other values, conditions, parameters, and the like may be evaluated in order to select the wireless network over which requested content is transmitted to user terminals.

Although primarily described with respect to generally evaluating network selection parameters without respect to specific values, thresholds, conditions, and the like, network selection parameters may be evaluated in any manner adapted for selecting the wireless network over which requested content is transmitted to user terminals. In one embodiment, for example, network selection parameters may be evaluated with respect to corresponding conditions (i.e., comparing network selection parameter values to condition thresholds in order to determine which conditions are satisfied and, optionally, an amount by which those conditions are satisfied). In one further embodiment, multiple network selection parameter values and associated condition thresholds may be evaluated for a given network selection parameter in order to select the wireless network over which requested content is transmitted to user terminals.

At step 210 (an optional step), content transmission scheduling information is transmitted to user terminals associated with content requests. In one embodiment, the content transmission scheduling information is transmitted over the unicast network. In one such embodiment, the content transmission scheduling information is transmitted using downstream links of respective bidirectional wireless links supported by the unicast wireless network for respective user terminals associated with the content requests (illustratively, using downstream links of BWLs 111 of UWN 110). In another embodiment, content transmission scheduling information may be transmitted over the broadcast wireless network. The content transmission scheduling information may include any information specifying transmission of content to user terminals.

The content transmission scheduling information enables the user terminals to prepare to receive the requested content. For example, content transmission scheduling information may include the time at which transmission of the content is scheduled to begin. In one such example, a user terminal that is in a dormant state at the time at which transmission of the requested content is scheduled to begin may be switched from the dormant state to an active state such that the user terminal receives the transmitted content. The content transmission schedule information may include one or more other parameters associated with transmission of the content (e.g., the network over which the content is to be transmitted, a format in which the content is to be transmitted, a quality-of-service with which the content is to be transmitted, and the like).

At step 212, the requested content is transmitted over the selected wireless network (e.g., over a unicast wireless network or a broadcast wireless network). As described herein, transmission of the requested content may be initiated directly by the content management system, or indirectly by the content management system (e.g., by triggering one or more content servers to begin transmitting the requested content at the scheduled transmission time). The requested content may be transmitted over the wireless networks using various different formats, depending on the type of wireless network, type of content, quality of content, and the like, as well as various combinations thereof. The transmission of requested content over the selected wireless network is depicted and described in additional detail with respect to FIG. 1. At step 214, method 200 ends.

Although omitted for purposes of clarity, after selection of the wireless network over which requested content will be transmitted, CMS 160 may utilize various other content delivery scheduling algorithms and techniques in order to further optimize delivery of content from content servers to user terminals using the selected wireless network. Similarly, although omitted for purposes of clarity, after selection of the wireless network over which requested content will be transmitted, CMS 160 may utilize various other content delivery scheduling algorithms and techniques in order to further optimize delivery of content from content servers to user terminals by selecting a different wireless network over which requested content will be transmitted (e.g., switching from selecting a unicast wireless network to selecting a broadcast wireless network, switching from selecting a broadcast wireless network to selecting a unicast wireless network, and the like).

In one embodiment, CMS 160 may generate content transmission schedules specifying transmission of content in response to content requests. A content transmission schedule specifies requested content to be transmitted and a time at which the requested content is to be transmitted and, optionally, may include other information associated with transmission of the requested content. For example, the content transmission may include one or more of a source(s) of the content, a channel over which the content will be transmitted, a format in which the content will be transmitted, a quality-of-service with which the content will be transmitted, and the like, as well as various combinations thereof. A content transmission schedule may include more or less information as required.

In one embodiment, content transmission schedules may be updated dynamically. In one such embodiment, content transmission schedules may be updated as conditions change (e.g., as new content requests are identified, as content deadlines approach, as network load conditions change, and the like, as well as various combinations thereof). The content transmission schedules may be updated up until the time that transmission of the requested content begins. The content transmission schedules may be updated such that the wireless network initially selected for providing requested content a user terminal(s) changes. For example, a content transmission schedule specifying transmission of requested content over a unicast wireless network (e.g., created in response to a single content request) may be changed to specify transmission of the requested content over a broadcast wireless network (e.g., as conditions change, such as when a large number of additional requests for that content are identified prior to the time at which transmission of the requested content is scheduled to begin).

Although omitted for purposes of clarity, one or more acknowledgment schemes may be implemented in order to increase the reliability of dynamic content delivery. In one embodiment, for example, UTs 102 may transmit acknowledgement messages to CMS 160 (and/or CSs 150) over UWN 110 in response to receiving requested content (or portions of requested content) over BWN 120. In another embodiment, for example, in which content transmission scheduling information provided to UT(s) 102 includes a time at which the requested content is scheduled to be transmitted, failure of UT(s) 102 to receive the content at that time (or within a reasonable time thereafter), may result in transmission of a negative acknowledgement (NACK) message from the UT(s) 102 to CMS 160 (or CSs 150) using UWN 110.

The above-described acknowledgment schemes are merely exemplary acknowledgment schemes and, as such, the present invention is not limited to such acknowledgement schemes. Furthermore, the exact implementation of the acknowledgment scheme (e.g., types of acknowledgements, formats of acknowledgments, frequency of acknowledgements, and the like) may be dependent on one or more factors. For example, the exact implementation of the acknowledgment scheme (or schemes) may depend on factors such as the type of wireless network, the type of content being delivered, the quality-of-service with which content is scheduled to be provided, the level of service subscribed to by the user or requested by the user, and the like, as well as various combinations thereof.

Although primarily depicted and described herein with respect to implementation within a wireless network having one cellular region (for purposes of clarity), the present invention may be implemented within a wireless network having multiple cellular regions. In such embodiment, additional processing may be performed in order to group content requests associated with user terminals in different cellular regions, such that content requests may be evaluated with respect to other content requests associated with that cellular region. For example, in response to identifying a content request, the location (i.e., one of the cellular regions) of the user terminal with which that request is associated may be determined in order to group that content request with other content requests associated with user terminals located in that one of the cellular regions.

In one such embodiment, user terminal location may be considered to be a network selection parameter adapted for use in selecting the wireless network over which the content request (i.e., the content request associated with that user terminal) is served. For example, in a wireless network having two cellular regions, where the first cellular region includes a first unicast wireless network and a first broadcast wireless network and the second cellular region includes a second unicast wireless network and a second broadcast wireless network, a content request associated with a user terminal located in the second cellular region may be grouped with content requests associated with other user terminals located in the second cellular region, and selection of the wireless network over which to provide the requested content for those requests may be restricted to selection of one of the second unicast wireless network and the second broadcast wireless network.

Figure 3:
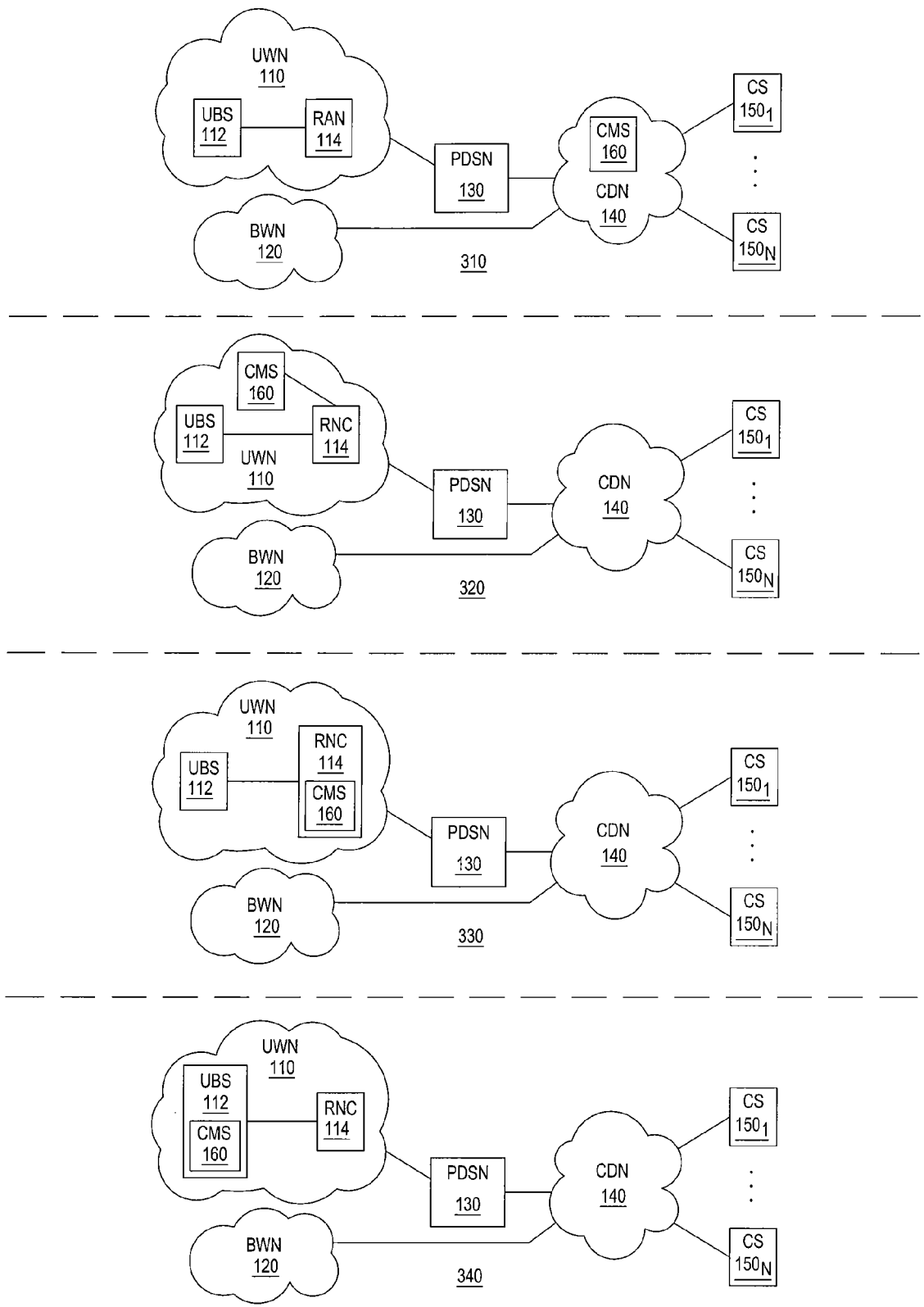
FIG. 3 depicts high-level block diagrams of exemplary implementation scenarios.

As depicted in FIG. 1, CMS 160 is depicted and described as being generally associated with communication network 100. Specifically, as depicted and described with respect to FIG. 1, CMS 160 is deployed as a standalone system in communication with CDN 140. Although primarily depicted and described herein with respect to the implementation scenario of FIG. 1, various other implementation scenarios may be used in accordance with the present invention (some examples of which are depicted and described herein with respect to FIG. 3). FIG. 3 depicts high-level block diagrams of exemplary implementation scenarios (alternative scenarios for implementation of CMS 160 depicted and described herein with respect to FIG. 1).

As depicted in FIG. 3, in one embodiment (depicted as communication network 310 of FIG. 3) CMS 160 may be implemented within CDN 140. In one such embodiment, CMS 160 may be implemented as a standalone system hosted within CDN 140. In another such embodiment, CMS 160 may be co-located on one or more existing systems within CDN 140. In such embodiments, no changes are required to the existing network elements or existing standard by which such network elements operate, and issues such as user mobility/roaming are easily dealt with; however, other implementation scenarios depicted and described herein with respect to FIG. 3 may provide better network performance (including better backhaul resource utilization and better air link resource utilization) and user experience.

As depicted in FIG. 3, in one embodiment (depicted as communication network 320 of FIG. 3) CMS 160 may be implemented as a standalone system hosted within UWN 110 (receiving feedback from UWN 110). In such embodiments, content may be transmitted to user terminals anywhere within the routing area, minimal changes are required to the existing network elements (e.g., UBS 112 and RNC 114), and no changes are required to existing standards by which such network elements operate. Furthermore, in such embodiments, battery drain associated with user terminals receiving content is minimized, impact on other user terminals is minimized, and overall network performance is improved (e.g., TCP performance may be enhanced using lower layer information, under-utilized backhaul resources are utilized, and other network performance improvements may be realized).

As depicted in FIG. 3, in one embodiment (depicted as communication network 330 of FIG. 3), CMS 160 may be implemented on RNC 114 of UWN 110 (as software and storage on RNC 114). In such embodiments, content may be transmitted to user terminals anywhere within the routing area and, although changes are required to RNC 114, minimal changes are required to other existing network elements (e.g., UBS 112) and no changes are required to existing standards by which such network elements operate. Furthermore, in such embodiments, battery drain associated with user terminals receiving content is minimized, impact on other user terminals is minimized, and overall network performance is improved (e.g., TCP performance may be enhanced using lower layer information, under-utilized backhaul resources are utilized, and other network performance improvements may be realized).

As depicted in FIG. 3, in one embodiment (depicted as communication network 340 of FIG. 3), CMS 160 may be implemented on UBS 112 of UWN 110 (as software and storage on UBS 112, or across multiple unicast base stations serving different cellular regions). In such embodiments, optimum user experience is achieved (e.g., battery drain associated with user terminals receiving content is minimized and impact on other user terminals is minimized by leveraging a finer granularity of state information) and overall network performance is improved; however, such embodiments may result in complex mobility management (e.g., the user may leave the cellular region before the requested content has been completely received by the user terminal).

Although depicted and described herein with respect to specific implementation scenarios, various other implementation scenarios may be utilized in accordance with the present invention. In some embodiments, CMS 160 may be implemented across multiple networks (e.g., a first portion of the functions of CMS 160 may be implemented within CDN 140 and a second portion of the functions of CMS 160 may be implemented within UWN 110). In some embodiments, CMS 160 may be implemented across multiple network components (both within and between networks). For example, in one embodiment, CMS 160 may be distributed across RNC 114 and BSs 112 such that various combinations of software and storage required in support of the functions of CMS 160 is implemented across the different network components.

Figure 4:
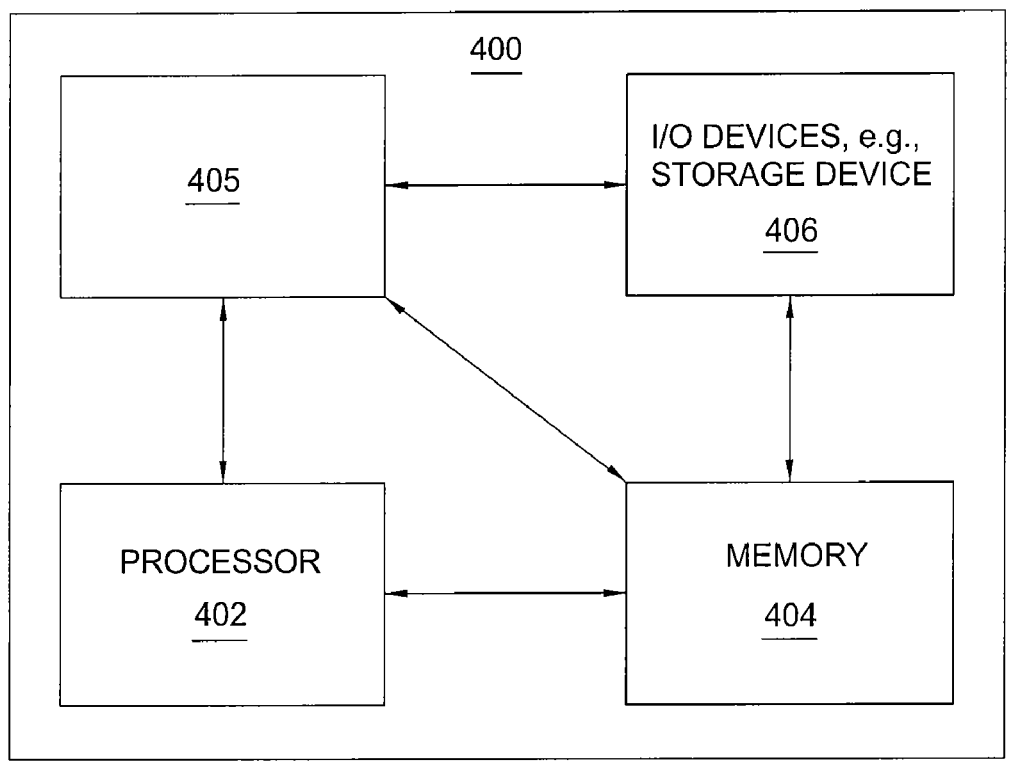
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a content management module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present content management process 405 can be loaded into memory 404 and executed by processor 402 to implement the functions as discussed hereinabove. As such, content management process 405 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for providing content to a user terminal, comprising:
    identifying a request for content, wherein the request for content is associated with the user terminal, wherein the requested content comprises at least one of audio content and video content;
    obtaining a network selection parameter for the content request, the network selection parameter comprising a service subscription level associated with a user of the user terminal;
    selecting, using the network selection parameter, a wireless network over which to propagate the requested content, wherein selecting the wireless network comprises selecting whether to propagate the requested content via a unicast wireless network or a broadcast wireless network, the unicast wireless network being selected when the service subscription level for the user is a first subscription level, and the broadcast wireless network being selected when the service subscription level for the user is a second subscription level; and
    propagating the requested content toward the user terminal using the selected wireless network.

2. The method of claim 1, wherein identifying the content request comprises one of:
    receiving the content request from the user terminal over the unicast wireless network; and
    detecting that the content is available and determining that a user associated with the user terminal is registered to receive the available content.

3. The method of claim 1, wherein the network selection parameter comprises at least one of a delivery time associated with the requested content, a number of other user terminals requesting the content, an available network bandwidth associated with the unicast wireless network, an available network bandwidth associated with the broadcast wireless network, and user subscription information.

4. The method of claim 1, further comprising:
    providing scheduling information toward the user terminal over the unicast network, wherein the scheduling information comprises a time at which transmission of the requested content over the selected network is schedule to begin.

5. The method of claim 4, wherein the scheduling information is adapted for use by the user terminal in switching from a dormant state to an active state prior to transmission of the requested content toward the user terminal.

6. The method of claim 1, further comprising:
    identifying at least one other request for content associated with at least one other user terminal;
    grouping the content request associated with the user terminal and the at least one other content request associated with the at least one other user terminal in response to a determination that the at least one other content request is for the same content as the content request associated with the user terminal;
    selecting the broadcast wireless network for providing the content for the grouped content requests; and
    propagating the requested content toward the user terminals over the broadcast wireless network.

7. The method of claim 1, wherein the network selection parameter further comprises a delivery deadline for the requested content.

8. The method of claim 7, wherein:
    when the delivery deadline is indicative that there is insufficient time to wait for batching of the request for the content with other requests for the content, the unicast wireless network is selected; and
    when the delivery deadline is indicative that there is sufficient time to wait for batching of the request for the content with other requests for the content, the broadcast network is selected.

9. The method of claim 1, wherein the network selection parameter further comprises a number of pending requests for the content.

10. The method of claim 9, wherein:
    when the number of pending requests is below a threshold, the broadcast wireless network is selected in response to a determination that the unicast wireless network is overloaded.

11. The method of claim 9, wherein:
    when the number of pending requests is above a threshold, the unicast wireless network is selected in response to a determination that the broadcast wireless network is overloaded.

12. The method of claim 1, wherein the network selection parameter further comprises a request rate indicative of a likelihood that the requested content is requested by other user terminals.

13. The method of claim 12, wherein:
    when the request rate satisfies a first threshold, the unicast wireless network is selected;
    when the request rate satisfies a second threshold, the broadcast wireless network is selected.

14. An apparatus for providing content to a user terminal, comprising:
    means for identifying a request for content, wherein the request for content is associated with the user terminal, wherein the requested content comprises at least one of audio content and video content;
    means for obtaining a network selection parameter for the content request wherein the network selection parameter comprises a service subscription level associated with a user of the user terminal;
    means for selecting, using the network selection parameter, a wireless network over which to propagate the requested content, wherein selecting the wireless network comprises selecting whether to propagate the requested content via a unicast wireless network or a broadcast wireless network, the unicast wireless network being selected when the service subscription level for the user is a first subscription level, and the broadcast wireless network being selected when the service subscription level for the user is a second subscription level; and means for propagating the requested content toward the user terminal using the selected wireless network.

15. The apparatus of claim 14, wherein the means for identifying the content request comprises at least one of:

means for receiving the content request from the user terminal over the unicast wireless network; and means for detecting that the content is available and determining that a user associated with the user terminal is registered to receive the available content.

16. The apparatus of claim 14, wherein the network selection parameter comprises at least one of a delivery time associated with the requested content, a number of other user terminals requesting the content, an available network bandwidth associated with the unicast wireless network, an available network bandwidth associated with the broadcast wireless network, and user subscription information.

17. The apparatus of claim 14, further comprising:

means for providing scheduling information toward the user terminal over the unicast network, wherein the scheduling information comprises a time at which transmission of the requested content over the selected network is schedule to begin.

18. The apparatus of claim 17, wherein the scheduling information is adapted for use by the user terminal in switching from a dormant state to an active state prior to transmission of the requested content toward the user terminal.

19. The apparatus of claim 14, further comprising:

means for identifying at least one other request for content associated with at least one other user terminal;

means for grouping the content request associated with the user terminal and the at least one other content request associated with the at least one other user terminal in response to a determination that the at least one other content request is for the same content as the content request associated with the user terminal;

means for selecting the broadcast wireless network for providing the content for the grouped content requests; and means for propagating the requested content toward the user terminals over the broadcast wireless network.

20. A non-transitory computer readable storage medium storing a software program, that, when executed by a computer, causes the computer to perform a method for providing content to a user terminal, the method comprising:

identifying a request for content, wherein the request for content is associated with the user terminal, wherein the requested content comprises at least one of audio content and video content;

obtaining a network selection parameter for the content request, the network selection parameter comprising a service subscription level associated with a user of the user terminal;

selecting, using the network selection parameter, a wireless network over which to propagate the requested content, wherein selecting the wireless network comprises selecting whether to propagate the requested content via a unicast wireless network or a broadcast wireless network, the unicast wireless network being selected when the service subscription level for the user is a first subscription level, and the broadcast wireless network being selected when the service subscription level for the user is a second subscription level; and propagating the requested content toward the user terminal using the selected wireless network.

21. The non-transitory computer readable storage medium of claim 20, wherein identifying the content request comprises one of:

receiving the content request from the user terminal over the unicast wireless network; or detecting that the content is available and determining that a user associated with the user terminal is registered to receive the available content.

22. The non-transitory computer readable storage medium of claim 20, wherein the network selection parameter comprises at least one of a delivery time associated with the requested content, a number of other user terminals requesting the content, an available network bandwidth associated with the unicast wireless network, an available network bandwidth associated with the broadcast wireless network, and user subscription information.

23. The non-transitory computer readable storage medium of claim 20, further comprising:

providing scheduling information toward the user terminal over the unicast network, wherein the scheduling information comprises a time at which transmission of the requested content over the selected network is schedule to begin.

24. The non-transitory computer readable storage medium of claim 23, wherein the scheduling information is adapted for use by the user terminal in switching from a dormant state to an active state prior to transmission of the requested content toward the user terminal.

\* \* \* \* \*